United States Patent [19]

Westhead

[11] Patent Number: 4,675,229
[45] Date of Patent: Jun. 23, 1987

[54] SPIRAL COIL CORRUGATOR BELT

[75] Inventor: William T. Westhead, Waycross, Ga.

[73] Assignee: Scapa Inc., Waycross, Ga.

[21] Appl. No.: 822,210

[22] Filed: Jan. 24, 1986

[51] Int. Cl.$^4$ .......................... B32B 5/32; B32B 7/00
[52] U.S. Cl. ................................... 428/222; 428/234;
    428/300; 428/311.1; 428/316.6
[58] Field of Search ............ 428/222, 234, 300, 311.1,
    428/316.6

[56] References Cited
U.S. PATENT DOCUMENTS

| | | | |
|---|---|---|---|
| 4,345,730 | 8/1982 | Leuvelink | 428/222 |
| 4,414,263 | 11/1983 | Miller et al. | 428/234 |
| 4,528,236 | 7/1985 | Finn et al. | 428/222 |
| 4,579,771 | 4/1986 | Finn et al. | 428/222 |
| 4,588,632 | 5/1986 | Gisbourne et al. | 428/212 |
| 4,601,942 | 7/1986 | Finn et al. | 428/222 |

Primary Examiner—Marion C. McCamish
Attorney, Agent, or Firm—Fleit, Jacobson, Cohn & Price

[57] ABSTRACT

A belt structure including a carrier formed from a plurality of intermeshing spiral coils with adjacent coils interconnected by hinge yarns. The spiral coil carrier is plated under tension and heated to cause the spiral coils to extend longitudinally to define spaced upper and lower substantially flat surfaces. A yieldable, porous batt of synthetic fibrous material is needled into and onto one surface of the carrier. As an alternative structure, a yieldable, porous, open cell foam is applied to the spiral coil carrier to fill the interior thereof, and to extend outwardly from one surface to form an outer foam layer. The belts are particularly suitable as pressure and transporting belts in a corrugating machine, but can also be used in wet press and dryer sections of papermaking machines.

24 Claims, 8 Drawing Figures

SPIRAL COIL CORRUGATOR BELT

BACKGROUND OF THE INVENTION

1. Field of the Invention

The present invention relates to corrugator belts, and more particularly to a corrugator belt structure incorporating a spiral coil carrier having either a fibrous batt secured thereto or having a foam coating thereon, for engagement with a surface of a corrugated sheet.

2. Description of the Prior Art

Corrugator belts are used in corrugating machines to feed sheet material through the machine, as well as to apply pressure to the sheet material to facilitate joining together of the several sheets of material forming a sheet of faced corrugated paperboard. Conventional corrugating machine belts are normally either a woven fabric or, alternatively, a woven fabric carrier that has a batt of fabric material needled thereto that is adapted to come into direct contact with and bear against a surface of the sheet material that passes through the corrugating machine. The conventional corrugator belts presently in use have a number of shortcomings. Included within those shortcomings is a tendency for the belts to wear at the outer edges thereof, when a narrow sheet of corrugated board is being formed, as a result of sagging of the belt edges and rubbing along the heater unit that is provided to dry the glue used to adhere the respective individual facing sheet or sheets that are combined to form a composite sheet of corrugated paperboard.

In addition to edge wear, the present corrugator belts also include heavy metal hooks that join together the ends of the belt to thereby form an endless belt structure. The hooks result in a seam in the belt that can cause a mark on the surface of the corrugated paperboard because of the reduced tendency of the belt to deflect in the seam area as compared with the more resilient surrounding portions of the belt.

Other problems that result from the use of present corrugator belts include poor frictional characteristics that result in slippage of the belt relative to the facing of the sheet of corrugated board that is being formed, stretching of the belt and sometimes breakage because of age of the fabric, and necking of the fabric, which is manifested as contraction widthwise of the belt if left stationary in contact with the heater plate of a corrugating machine. Further, conventional corrugator belts also sometimes run wet because of the absorption thereby of moisture, which leads to poor sheet drying, and possible sheet warping or curl, and they are also readily contaminated by glue or other materials and consequently require periodical removal for cleaning.

It is an object of the present invention to provide a corrugator belt structure that overcomes the deficiencies noted hereinabove with respect to the presently used corrugator belt structures.

SUMMARY OF THE INVENTION

Briefly stated, in accordance with one aspect of the present invention, a corrugator belt is provided having a spiral coil carrier, the coil structure including a plurality of hinge yarns, all of the hinge yarns extending in a common direction, and a plurality of spiral coils disposed in a common plane in a side-by-side relationship, each of the coils extending in the common direction, adjacent coils of the spirals being intermeshed and held together in intermeshing relationship by at least one of the hinge yarns. After assembly the fabric is first subjected to a controlled heat treatment. A batt of synthetic fibrous material is then needled to one surface of the carrier for contact with the surface of the sheet of corrugated board, in order to form a belt that permits the application to the corrugated sheet of substantially uniform friction and pressure for moving the sheet along a machine.

In accordance with another aspect of the present invention, a carrier is formed from a plurality of spiral coils, the coils being in intermeshing relationship and connected by respective hinge yarns to form a carrier structure that is subsequently flattened by applying heat and tension to the carrier sheet. The interior of the resulting carrier is filled with an open cell foam, and the foam extends beyond one surface of the carrier to provide an external foam layer that is adapted to contact the sheet of corrugated board.

If desired, a silicone based release treatment can be applied to the outer surface of the batt or foam to reduce the build-up of contaminants on and in the belt.

DESCRIPTION OF THE PREFERRED EMBODIMENTS

Figure 1:
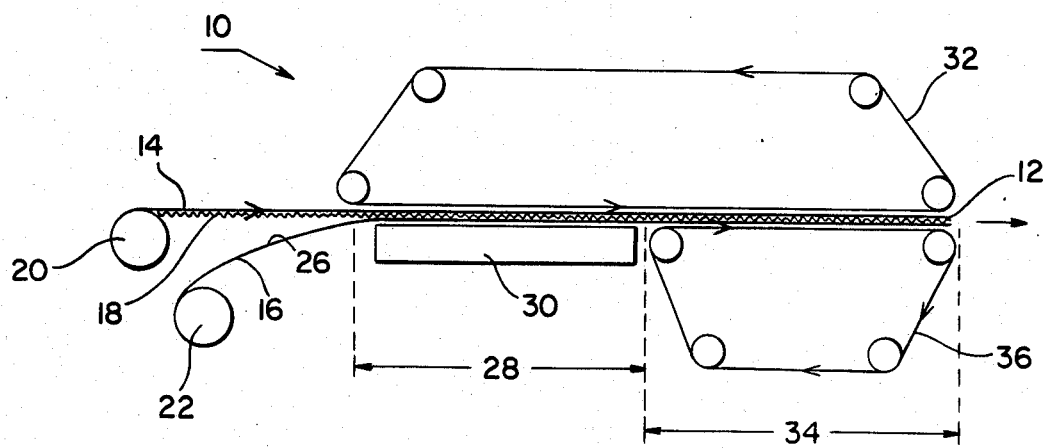
FIG. 1 is a schematic view showing a portion of a corrugating machine for forming a composite sheet including a corrugated sheet and one or more flat facing sheets adhered to the corrugated sheet.

Referring now to the drawings, and particularly to FIG. 1 thereof, there is shown a portion of a machine 10 for forming a composite sheet of corrugated paperboard 12. The portion of the machine shown is the part where the respective individual sheets are joined together to form the composite sheet.

The composite sheet of corrugated board 12 includes a flat top sheet 14, a flat bottom sheet 16, and an intermediate sheet 18 that is of corrugated configuration. Intermediate sheet 18 includes generally sinusoidal corrugations that extend across the width of the sheet and is sandwiched between top sheet 14 and bottom sheet 16. The respective sheets 14, 16 are typically made from kraft paper, and can have a thickness of about 0.016 inches and a basis weight of about 42 lbs/1000 sq ft., ranging from about 26 to about 90 lbs/1000 sq. ft. Intermediate sheet 18 of corrugated paperboard typically has a thickness of about 0.010 inches and a basis weight of about 26 lbs/1000 sg. ft., ranging from about 26 to about 42 lbs/1000 sq. ft. Intermediate sheet 18 of corrugated paper can either be secured to the top sheet in a separate operation, in which a roll 20 of board is provided wherein the board includes a flat facing sheet to which a corrugated sheet is adhered as shown in FIG. 1, or alternatively, separate rolls (not shown) to provide the top sheet and the corrugated intermediate sheet can be provided. Bottom sheet 16 is supplied from a roll 22, or the like, and a glue layer 24 is applied to the surface 26 of sheet 16 that is adapted to come into contact with the corrugated intermediate sheet 18. The two sheets, or three, as the case may be, are fed to a heating zone 28 which includes a heater plate 30 that serves to heat and thereby dry the glue. Heater plate 30 includes a flat surface over which the sheets pass, and pressure is applied to the total sheet structure 12 by means of an upper belt 32 that is so positioned as to cause uniform pressure to be applied to the respective sheets of material to press them against the surface of heater plate 30. Although illustrated and described herein as a three layer sheet of double faced corrugated board in the form of a corrugated inner sheet and flat facing sheets on each face of the corrugated sheet, it will be apparent to those skilled in the art that the corrugator belt herein described can also be used to make single faced corrugated board, multiple wall corrugated board, or other laminated board structures.

Downstream of heating zone 28 is a cooling zone 34. The heated composite corrugated paperboard sheet is carried through cooling zone 34 between a lower belt 36 and upper belt 32 to permit the board to cool and the adhesive to set. Belts 32, 36 move together to carry the completed corrugated paperboard sheet to a downstream processing station (not shown) where the material is either die cut to a desired configuration in flat sheet form, or, alternatively, is rolled into rolls of suitable width and diameter for shipment to end users.

In transporting the corrugated paperboard sheet through the corrugating machine, the belts must have sufficient surface friction to convey the composite board through the machine without slippage, and they must also have good wear resistance to avoid the need for frequent replacement of the belts, which requires the machine to be shut down. Additionally, the belts should have good stability, particularly resistance to longitudinal and lateral stretching, so that they permit uniform tension across the belt to provide uniform drying of the glued corrugated board sheet. It is also desirable that the belts have sufficient permeability to allow escape of moisture, and thereby prevent curling or warping of the composite corrugated board sheets, that they be clean running in that they do not attract or retain foreign materials, and that they not cause undesired marks to be made in the resulting composite corrugated paperboard sheet.

Figure 2:
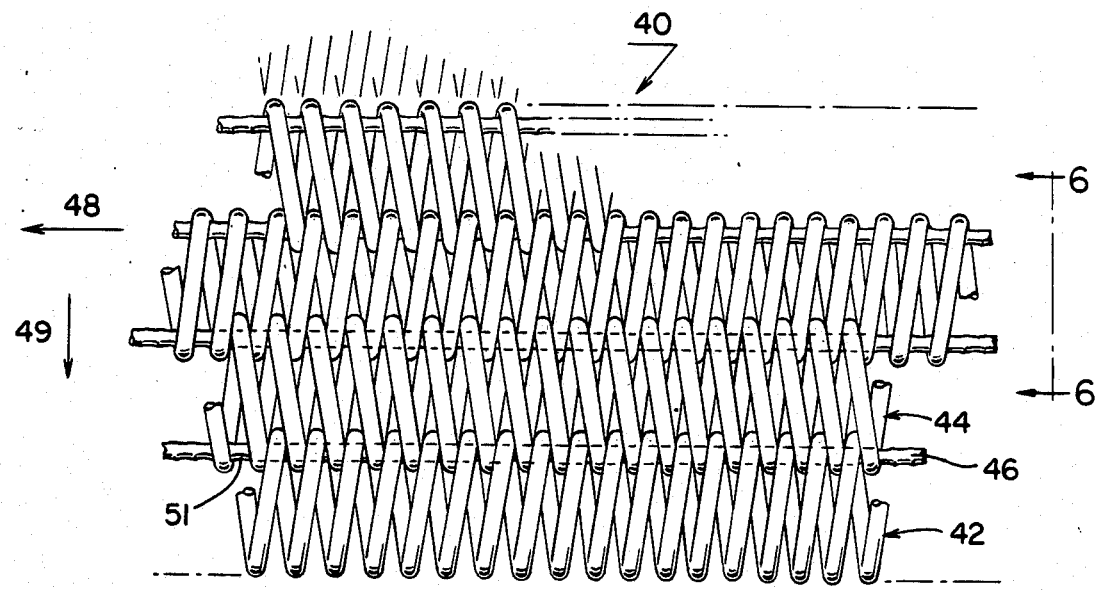
FIG. 2 is a fragmentary plan view of a spiral coil carrier for a corrugator belt in accordance with the present invention, and in which the carrier is formed from monofilament yarns having a circular cross section.

Referring now to FIG. 2, a portion of a belt in accordance with the present invention is shown and generally identified as carriers 40. In that connection, it is to be understood that the drawing figures are in the nature of schematic representations and do not necessarily illustrate the elements of the carrier to any precise scale.

Carrier 40 basically comprises a plurality of spiral S-coils 42 joined together with a plurality of spiral Z-coils 44 through the use of hinge yarns 46 to define the carrier. The letters "S" and "Z" indicate the direction of twist of the spiral coils. A spiral coil has an S-twist if, when it is held vertically, the spirals or convolutions around its central axis slope in the same direction as the middle portion of the letter S, and a Z-twist if the spirals slope in the same direction as the central portion of the letter Z.

The spiral coils 42 and 44 each consist of lengths of spiral monofilament, i.e., a monofilament with the appearance of a spring coil. The monofilament is synthetic in nature and is typically made from polyester, although other materials, such as polyamide, polyolefin, polyetheretherketone, and the like, can also be used.

Figure 3:
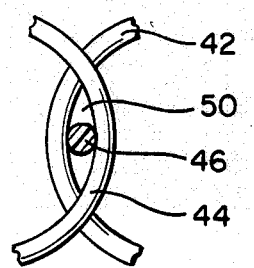
FIG. 3 is a fragmentary view showing portions of two interengaged coils with a hinge yarn extending therethrough.

In constructing a spiral coil carrier, a spiral coil (in this case S-coil 42) is first selected and laid out in what will eventually become the cross-machine direction, as indicated by arrow 48. Thus it can be appreciated that the width of the carrier is determined by the length of the coil. A second spiral (in this case Z-coil 44) is then intermeshed with the first spiral coil 42 in side-by side relationship to define a biconvex appearing hinge yarn-receiving opening 50 therebetween (see FIG. 3). Opening 50 receives a hinge yarn 46, which also extends in the cross-machine direction, and which is also typically a synthetic monofilament, and, like the spiral coils, may be made of polyester, polyamide, polyolefin, polyetheretherketone, and the like. When inserted into the adjacent intermeshed spiral coils, hinge yarn 46 acts as a pivot or hinge for interconnecting the adjacent coils.

The laying down of additional interengaged spiral coils in an alternating 'S' coil and 'Z' coil relationship with the subsequent insertion of a hinge yarn within the respective openings defined therebetween is continued until a carrier of desired length is produced. The spiral coils are alternately S-twist and Z-twist coils so as to reduce torque in the carrier.

Hinge yarns 46 can be of circular cross section, although yarns of non-circular cross section can also be employed, if desired. The overall size and shape of the hinge yarns depends on the size and shape of the spiral coil yarns and the yarn-receiving openings that the coils define when they are intermeshed, as well as the desired permeability of the carrier.

After the carrier has been formed through the intermeshing of the alternate S-twist and Z-twist coils and the insertion therewithin of the hinge yarns to form an endless carrier structure, the carrier is then subjected to heat treatment while it is under controlled tension. The tension is applied in what will become the machine direction (arrow 49 as seen in FIG. 2). Under these circumstances, the spiral coils 42, 44, which were originally circular or elliptical in transverse section, become flattened and their inner surfaces press up against the hinge yarns. At the same time, the controlled tensioning of the belt while being heated and the resultant flattening of the spiral coils causes crimping 51, or surface undulations (see FIG. 2), to occur in the hinge yarns. The crimp or undulations resulting from the heat treatment is desirable to stabilize the carrier and to ensure good runnability on a machine, i.e., no distortion or stretching. The crimping or undulations also ensures that the hinge yarns do not move laterally, which would cause separation of adjacent coils and would leave an opening at either edge of the carrier. Thus, upon completion of the heating under controlled tension, a carrier results in which the hinge yarns all lie in a common plane. In like manner, the spiral coils are flattened, and the upper and lower surfaces of the coils lie in respective spaced parallel planes of the carrier.

The flatness of the upper sheet receiving and the lower machine-roll contacting surfaces of the carrier can be controlled by the appropriate use of temperature, time, and tension. The spirals are flattened so that they are pulled into close contact around the sides of the hinge yarns by increasing either the temperature, the time, or the tension, or any combination of those factors.

Figure 4:
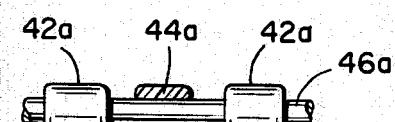
FIG. 4 is a cross-sectional view through a spiral coil carrier showing coil yarns having a non-circular cross section.
Figure 5:
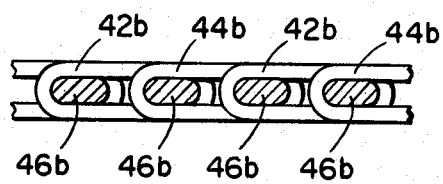
FIG. 5 is a fragmentary cross-sectional view through a spiral coil carrier wherein the hinge yarns interconnecting the coils are formed from non-circular yarns and the coils have been flattened.

The carrier illustrated in FIG. 2 includes spiral coils and hinge yarns that are formed from monofilaments or monofilament-like yarns having circular cross sections. FIGS. 4 and 5 show alternative structures wherein the carrier is formed from spiral coils having non-circular coil yarns 42a, 44a interconnected by hinge yarns 46a (FIG. 4), or wherein the carrier is formed from non-circular hinge yarns 46b that interconnect coil yarns 42b, 44b (FIG. 5), in order to provide a desired permeability for the carrier fabric. The non-circular yarns can be defined by major and minor axes, the major axes lying parallel to the carrier surfaces. The yarn dimensions along the minor and major axes can be in the ratio of from about 1:1.1 to about 1:6, and preferably in the ratio of from about 1:1.1 to about 1:2.5. Although described herein principally in terms of its application to a corrugating machine belt, the carrier structure as herein disclosed can also be used in the wet press and dryer sections of papermaking machines, if desired. In that event, the provision of suitable non-circular coil or hinge yarns can be used advantageously to provide a carrier having a desired permeability.

Figure 6:
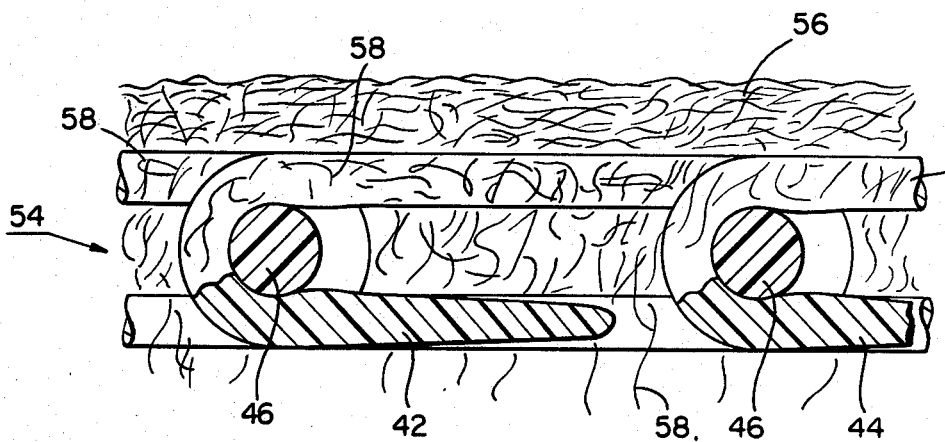
FIG. 6 is a fragmentary cross-sectional view taken along the line 6—6 of FIG. 2 showing a spiral coil carrier, the carrier having a fiber batt needled so that fibers extend into the carrier and the batt protrudes above the surface of the carrier.

As seen in FIG. 6, one of the outer surfaces 52 of the carrier 54, as defined by the flattened coils 42, 44, includes a coherent batt 56 of fibrous material that is needled both into and onto carrier 54 by a conventional needling process, which is familiar to those skilled in the art. Batt 56 is preferably formed from a plurality of polymeric fibers 58 giving a finished belt thickness of from about 0.125 inches to about 0.375 inches, and the fibers are randomly arranged to provide a yieldable, porous, non-woven structure with spaces between adjacent fibers. Preferably, the fiber lengths are from about 2 inches to about 3½ inches. Batt 56 can be formed from polymeric fibers made from polyester, polypropylene, nylon 6, nylon 6.6, or the like, either separately or in various combinations, depending upon the properties required in the batt and the conditions to which the belt will ultimately be subjected. For example, for high heat and hydrolysis resistance, coupled with improved wear resistance, a batt formed from a blend of individual fibers of nylon 6.6 and individual fibers of polyester is preferred. In addition to the polymeric materials mentioned hereinabove, other fiber materials can also be used, such as, for example, P.B.I., manufactured by Celanese Fibers Operations, or Kevlar or Nomex, both of which are manufactured by E. I. duPont de Nemours Company, Inc.

Batt 56 is preferably uniformly needled into and onto one surface of carrier 54. Furthermore, it is preferred that the monofilament or monofilament-like yarns from which the spiral coils are formed have a diameter of less than 0.7 mm, preferably about 0.55 mm, in order to avoid excessive breakage of the needles during the course of the needling operation, and also to permit a tighter and more uniform interconnection between fibrous batt 56 and carrier 54 by virtue of greater engagement of batt fibers 58 with the surface portions of coil yarns 42, 44. The hinge yarns are preferably larger in diameter than the coil material in order to obtain the required thickness and stability in the carrier fabric. Preferred hinge yarn diameter can range from about 0.7 to about 0.9 mm.

After the batt has been needled so that a number of the batt fibers extend through the top surface of the carrier and into the interior thereof, some of the individual batt fibers can extend completely through the interior of the carrier to and through the bottom surface thereof. However, the fiber density at the bottom surface of the carrier is considerably smaller than the fiber density at the top surface, and those fibers that do extend outwardly from the bottom surface are relatively small in number and do not define a coherent batt on the bottom surface of the carrier. The needling process causes a number of the batt fibers to pass into the interior of the carrier and to interengage with interior portions of the coils that define the carrier. Thus, the batt does not merely contact the outer surface of the carrier, but a large number of the fibers that form the batt extend into and contact and engage with inner surfaces of the carrier to interconnect the batt to the carrier.

Preferably, the finished belt has a thickness that ranges from about 0.125 inches to about 0.375 inches, and preferably has a weight that ranges from about 6 to about 12 ounces per square foot. Additionally, the permeability of the belt is preferably from about 10 to about 200 cfm. As will be appreciated by those skilled in the art, the choice of batt weight and batt thickness will depend upon the ultimate properties required in the finished belt, which in turn will depend upon the particular end use to which the belt is put.

The wear resistance of the resulting belt having a batt and spiral coil carrier structure can be improved by subjecting the belt to a resin treatment by either lick roll application or by passing it through an acrylic-based resin solution, for example, Rhom and Haas Rhoplex No. TR407. Such resin treatment also prevents undesirable fluffing of the batt, and does not reduce or otherwise adversely affect the surface frictional properties of the belt.

It has been found that the application of a silicone based coating to the resulting belt serves as a release agent to reduce the buildup of contaminants on the belt structure. An example of such a silicone-based material is Sandoperm F.E., manufactured by Sandoz Inc. However, careful control must be maintained over the silicone treatment in order to maintain the desired frictional properties of the surface of the batt while also maintaining the desired contaminant release properties.

Figure 7:
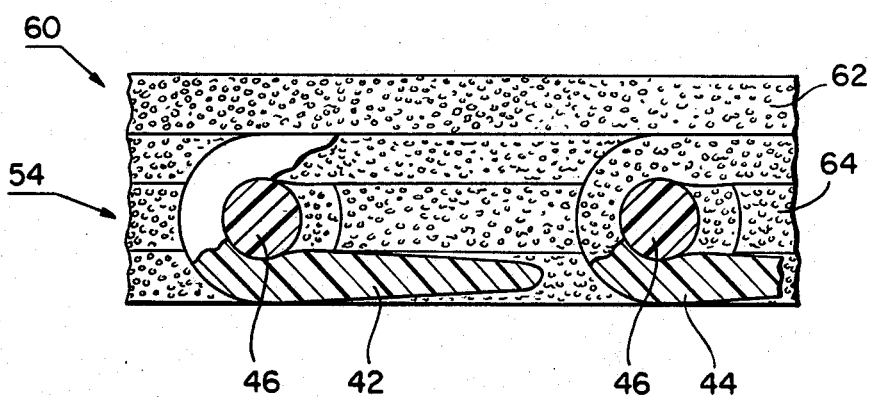
FIG. 7 is a fragmentary cross-sectional view similar to FIG. 6, but showing a spiral coil carrier with a foam material within the coils and extending beyond one surface thereof to provide a foam layer on the carrier.

The spiral coil carrier hereinbefore described can also be the carrier 54 that serves as the base for a corrugator belt 60 that includes a yieldable, porous foam surface 62, as well as a foam interior 64. Such a belt is shown in fragmentary cross-section in FIG. 7. In producing a foam-filled belt in accordance with the invention, a mechanical foam is provided by introducing a liquid resin and compressed air into a mixing head and blending the resin and air by means of a rotor to provide an elastomeric foam of requisite cell size, the resultant foam being spread onto the surface of the spiral coil carrier. The foam passes into the fabric and excess foam is removed by moving a doctor blade across the surface of the carrier, the spacing of the blade in relation to the surface being such as to provide the desired foam thickness on the outer surface of the carrier.

Figure 8:
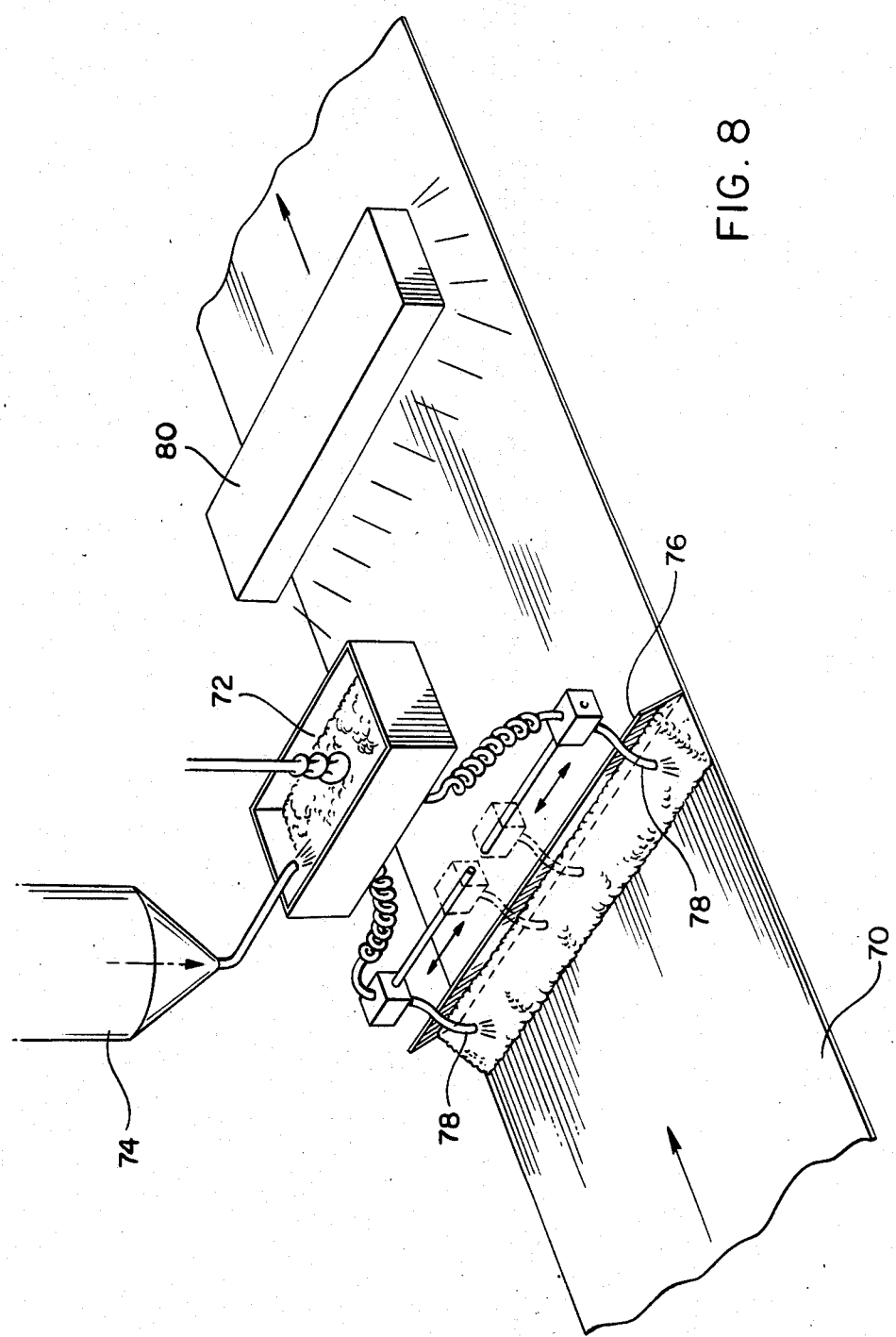
FIG. 8 is a fragmentary perspective view showing one form of apparatus that can be used to apply foam materials to a spiral coil carrier in accordance with the present invention.

An apparatus for providing a corrugator belt having a foam outer surface is illustrated schematically in FIG. 8, and involves the support of a spiral coil carrier 70, which is to be filled with foam, in endless form on spaced carrier rolls (not shown) and the application of a foam mix, as prepared in a foaming unit 72 from ingredients delivered thereto directly or from a resin container 74, to the upper surface of carrier 70 immediately in advance of a doctor blade 76 by delivery nozzles 78, each of which can reciprocate transversely between the middle of the carrier to a respective lateral edge thereof.

Delivery of the mix through the nozzles 78 builds up a quantity of foam mix against the doctor blade 76 at the upstream side thereof, and the mix passes into the interior of carrier 70 by the combined effects of gravity and of the doctor blade. Doctor blade 76 is spaced from the upper surface of fabric 70 to provide the desired surface thickness of foam.

Subsequent to the application of the foam mix, the mix is subjected to heat from an infra-red heater 80 beneath which the foamed-cover carrier is passed.

Multiple passes of the carrier beneath the doctor blade may be preferred in some instances to ensure complete filling of the voids within the carrier, as too may the provision of a stripper blade (not shown) at the underside of the carrier for the removal of any excess foam material that passes through the carrier. The foam mix is subjected to heat subsequent to application of the requisite amount of foam mix, whether by a single or by multiple passes of the carrier under the doctor blade.

Although it is preferred to use a mechanical foam, it may be possible in some instances to use a chemical foam, the purpose of the foam being simply to provide a foam interior and a continuous foam surface on the spiral coil carrier at the sheet-contacting side thereof. The foam will provide a requisite level of permeability and frictional properties.

In applying the foam to the spiral coil carrier, the foam can be applied in two layers, the first layer filling the internal structure of the carrier. A second application of the same foam is then applied to the surface of the previously filled spiral base fabric, and it is applied while the first application is still tacky, thereby promoting adhesion between the two foam applications. The second foam application can be applied to a uniform thickness that provides an outer foam surface that ranges in thickness from about 1/32 to ¼ inch, preferably from about 1/32 to about ⅛ inch. The larger the thickness of the foam that extends beyond the upper surface of the carrier, the more likely the foam is to break down, particularly if it is of a very porous open cell structure.

The foam applied to the surface of the carrier provides a soft surface on a very stable base material, and permeability ranging from about 5 to about 150 cfm can be obtained while maintaining the friction of the foam resin surface sufficiently high to carry the corrugated board through the machine.

The weight of the resulting belt in the form of a spiral coil carrier with a foam coating is relatively low, and can preferably range from about 5 to about 8 ounces per square foot because of the lightweight nature of the foam coating. As was the case with the batt-type belt hereinbefore described, a silicone-based release treatment can also be applied to the finished belt in order to reduce build-up of contaminants.

In the case of spiral coil carriers, it has been found that the foam material bonds directly to the monofilaments and provides a continuous layer that extends between and across adjacent coils, the foam thus providing a uniformity of permeability not attainable by the mere insertion of fillers into the individual coils. Furthermore, the desired cell size of the foam layer, advantageously being within the range of between 0.05 mm to 0.50 mm, militates against the accumulation of debris.

Because the density of the foam, and hence the cell size thereof, can be varied at will, not only can cell size be selected having regard to the average size of combined corrugator board contaminants, and particularly glues and fibrous debris, but a cell size can also be selected that is appropriate to the permeability characteristics required of the foam filled and coated carrier.

The continuity of the surface does of itself minimize creation of debris at the belt surface, but any such debris as does exist will lie on such surface and can easily be removed by washing.

Although it is preferred that the foam be applied to the surface of the carrier and be introduced into the interior of the carrier by the combined action of gravity and the doctor blade, it may be preferred, in some instances, to inject foam into the space within the coils, such foam flowing between such spaces to dislodge air present within the carrier.

A typical foam for use in the context of the invention can include an acrylic dispersion, or any other suitable material, which is foamed by the introduction of air into the compounded blend by mechanical action. Additives, for example thickeners and surfactants, can be dispersed in the polymer mix prior to coating, the relative quantities of such additives being selected so as to give a foam mix having properties appropriate to the ready application of the mix to the substrate and to the required characteristics of the foam both in and on the carrier. Further, the air delivery rate and blending action can be adjusted during foam generation so that a foam of the required density is obtained.

An anionic, plasticizer-free aqueous dispersion of a cross-linkable acrylic polymer, for example Rhoplex TR77 (Rohm and Haas Company), has been found suitable for use in the context of the invention, particularly when combined with a stiffer acrylic polymer, for example Rhoplex TR407 (Rohm and Haas Company). ASE-60 (Rohm and Haas Company) can be used to increase the viscosity of the mix on addition of ammonium stearate. Ammonia may be used to modify the pH and resultant viscosity of the mix. Surfactants such as sodium sulphur sucsyamate and ammonium stearate are used to impart stability, to modify the pH and to refine the wet foam.

Open cell foams for application in the context of the invention have a cell size lying within the range of about 0.05 to 0.50 mm. diameter, the range of cell sizes present in a particular foam when set being determined by:
(i) base material and additives used;
(ii) foam density; and
(iii) nature of the substrate.

A lower density foam contains an average greater diameter cell size than a higher density foam, and a standard mix of foam material foamed to different densities and applied to the same carrier will give a resultant belt permeability which varies according to the average cell size in the spaces within the carrier structure.

The following table shows the variation in permeability with variations of average cell size of a spiral coil carrier (having an initial permeability of 950 cfm or 15000 m³), including a plurality of interdigitated coils of polyester monofilament of 0.55 mm. diameter, the carrier having internal dimensions of 5.04×1.09 mm. after heat setting, the coils being joined by hinge wires:

| Average Cell Size (mm) | Permeability cfm | m³ | % reduction in permeability |
|---|---|---|---|
| 0.078 | 72 | 1,150 | 92 |
| 0.20 | 99 | 1,580 | 89 |
| 0.25 | 126 | 2,020 | 87 |
| 0.32 | 191 | 3,060 | 80 | cfm — cubic ft per square foot per min at ½" water guage differential pressure.
m³ — cubic meters per square meter per hour at 10 mm water guage.

Corrugator belts having the structures described hereinabove provide distinct improvements over existing corrugator belts. In particular, the use of a spiral coil carrier provides exceptional cross-machine rigidity, to keep the edges of the belt from drooping into contact with the heater unit when a narrow width board is being run, thereby avoiding the belt edge sag and rubbing of the edges of the belt along the heater unit that frequently occurs with conventional corrugator belts not formed from a spiral coil carrier. Additionally, the use of the spiral coil carrier permits the formation of an endless belt without any change in belt characteristics at the seam, and thereby avoids the need for heavy, metal seaming hooks that cause seam marking when non-spiral-coil carriers are used for such belts. Furthermore, the spiral coil carrier structure, being inherently stable, provides improved belt dimensional stability, and permits belts to be formed having stretch of less than about 1% at loads in excess of 50 pounds per linear inch. Because the spiral coil carrier undergoes a finishing process that includes subjecting it to temperatures well in excess of the temperature that the belt will see in actual use, the carrier will not shrink in width at temperatures of up to about 350° F., which are the maximum temperatures to which the heater plates in a corrugator machine can be set. Finally, the application of yieldable, porous foam and batt materials as hereinbefore described provide the desired frictional characteristics of the belt to cause it to operate effectively on a corrugating machine.

As earlier noted, the belts hereinabove described can be used in the wet press and dryer sections of papermaking machines. The use of spiral coil carriers in wet press felts offers a base fabric of excellent stability in the way of resistance to stretching and narrowing. The application of a needled batt or foam surface will give the necessary cushioning required in such felts while the open base of the spiral fabric allows for easy drainage of water.

In the dryer section of a papermaking machine, the use of spiral coil carriers provides for soft face, thinner fabrics having a range of permeabilities, thereby allowing moisture to escape more easily through the fabric as vapor from the wet paper sheet in the heat zone. As for wet felts, the spiral coil carriers also offer excellent fabric stability.

Although the present invention has been illustrated and described in the context of specific embodiments, it will be appreciated by those skilled in the art that various changes and modifications can be made without departing from the spirit of the present invention. It is therefore intended to cover in the appended claims all such changes and modifications that fall within the scope of the present invention.

What is claimed is:

1. A corrugator belt for contacting and conveying sheets of material and having an upper surface and a lower surface, said belt comprising:
 (a) a plurality of hinge yarns, all of said hinge yarns extending in a common direction;
 (b) a plurality of spiral coils disposed in a common plane in a side-by-side relationship, each of said coils extending in said common direction, adjacent coils of said spirals intermeshed and held together in intermeshing relationship by at least one of said hinge yarns to define a carrier having spaced upper and lower surfaces, said spiral coils having an elongated cross section; and
 (c) a yieldable, porous material extending into said spiral coils and non-adhesively secured to interior surfaces of said spiral coils, said porous material defining a layer extending uniformly outwardly of and beyond an outer surface of said carrier to provide a soft, sheet-contacting surface on said carrier.

2. A belt in accordance with claim 1, wherein said sheet-contacting surface includes a yieldable, porous, coherent batt of synthetic fibers needled into and onto one surface of said carrier.

3. A belt in accordance with claim 2, wherein said spiral coils are formed from a yarn having a substantially circular cross section and having a diameter of less than about 0.7 mm.

4. A belt in accordance with claim 3, wherein the yarn has a diameter of about 0.55 mm.

5. A belt in accordance with claim 2, wherein said batt is formed from fibers selected from the group consisting of polyester, polypropylene, nylon 6, and nylon 6.6.

6. A belt in accordance with claim 5, wherein said batt is formed from a blend of individual fibers of nylon 6.6 and individual fibers of polyester.

7. A belt in accordance with claim 2, wherein said batt fibers include a resin coating.

8. A belt in accordance with claim 7, wherein said coating is an acrylic resin.

9. A belt in accordance with claim 2, wherein said batt fibers include a silicone-based release coating.

10. A belt in accordance with claim 1, wherein said hinge yarns have a substantially circular cross-section and have a diameter of from about 0.7 mm to about 0.9 mm.

11. A belt in accordance with claim 1, wherein said hinge yarns have a non-circular cross section and include a major axis and a minor axis, the major axis lying parallel to the belt surface, and wherein said minor and major axes of each hinge yarn are in the ratio of from about 1:1.1 to about 1:6.

12. A belt in accordance with claim 11, wherein said ratio is in the range of from about 1:1.1 to about 1:2.5.

13. A belt in accordance with claim 1, wherein said belt has a weight from about 6 to about 12 ounces per square foot.

14. A belt in accordance with claim 1, wherein said belt has a thickness of from about 0.125 to about 0.375 inches.

15. A belt in accordance with claim 1, wherein said belt has a permeability of from about 10 to about 200 cfm.

16. A belt for contacting and conveying sheets of material and having an upper surface and a lower surface, said belt comprising:
(a) a plurality of hinge yarns, all of said hinge yarns extending in a common direction;
(b) a plurality of spiral coils disposed in a common plane in a side-by-side relationship, each of said coils extending in said common direction, adjacent coils of said spirals intermeshed and held together in intermeshing relationship by at least one of said hinge yarns to define a carrier having spaced upper and lower surfaces, said spiral coils having an elongated cross section; and
(c) a yieldable, porous material secured to interior surfaces of said spiral coils and extending uniformly outwardly of an outer surface thereof to provide a soft, sheet-contacting surface on said carrier, wherein said porous material includes an open cell foam within said carrier and extending outwardly beyond one surface thereof.

17. A belt in accordance with claim 16, wherein said foam includes a first foam layer that substantially fills the interior of said carrier, and a second foam layer applied to the exterior of said carrier and adherently bonded to said first foam layer.

18. A belt in accordance with claim 17, wherein said second foam layer extends outwardly beyond said one surface of said carrier at a thickness of from about 1/32 to about ¼ inch.

19. A belt in accordance with claim 17, wherein said second foam layer extends outwardly beyond said one surface of said carrier at a thickness of from about 1/32 to about ⅛ inch.

20. A belt in accordance with claim 16, wherein said foam is selected from the group consisting of acrylic, acrylate and acrylonitrile dispersions.

21. A belt in accordance with claim 20, wherein said belt has a permeability of from about 5 to about 150 cfm.

22. A belt in accordance with claim 16, wherein said open cell foam has a cell size of from about 0.05 to about 0.50 mm.

23. A belt in accordance with claim 16, wherein said belt has a weight of from about 4 to about 8 ounces per square foot.

24. A belt in accordance with claim 16, wherein said foam includes a silicone-based release coating.

* * * * *